Dec. 24, 1940.　　　　H. DAHLSTROM　　　　2,226,053
DIRIGIBLE LAMP
Filed Jan. 12, 1939　　　3 Sheets-Sheet 3
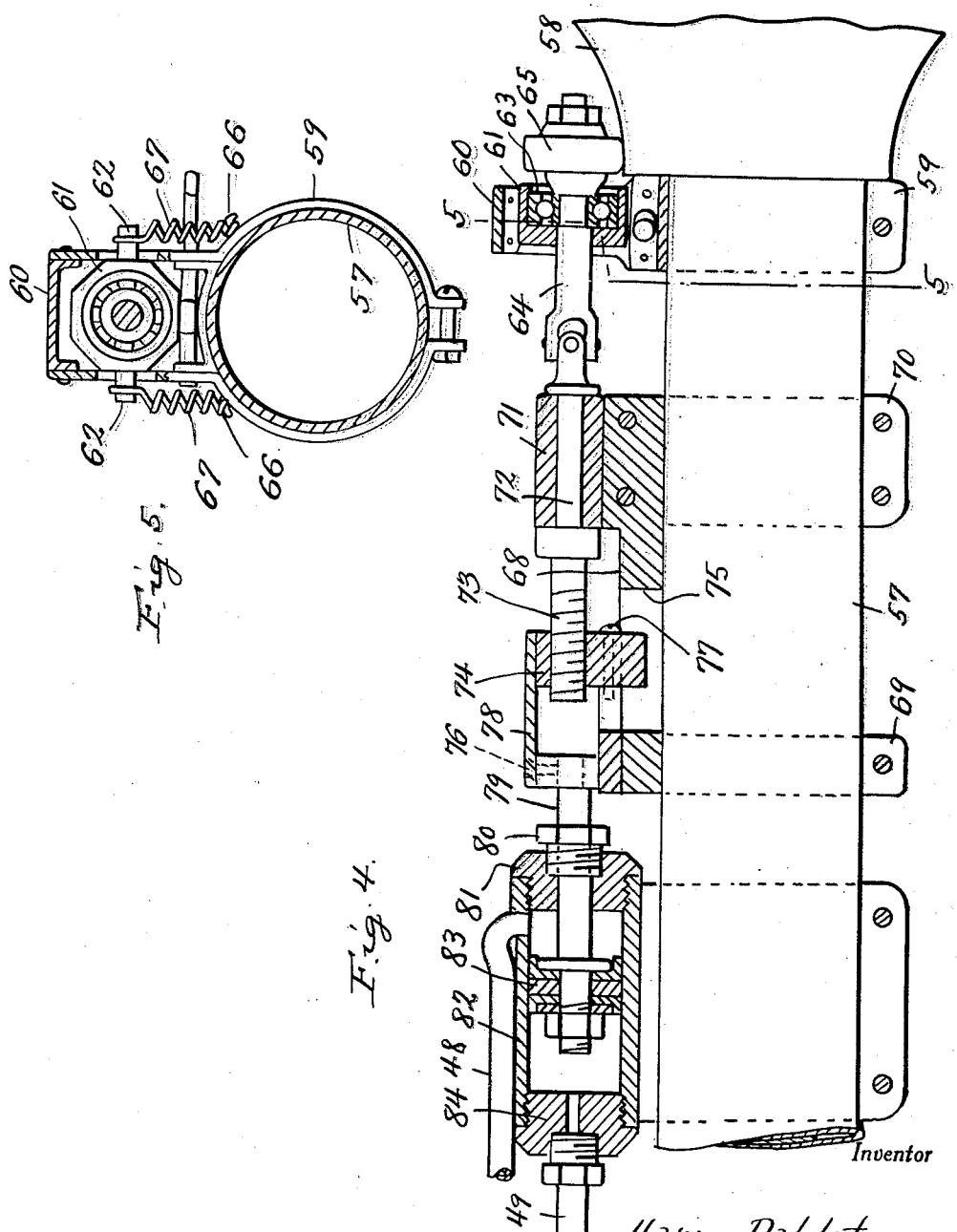
Inventor
Harry Dahlstrom
By Clarence A. O'Brien
and Hyman Berman
Attorneys Patented Dec. 24, 1940

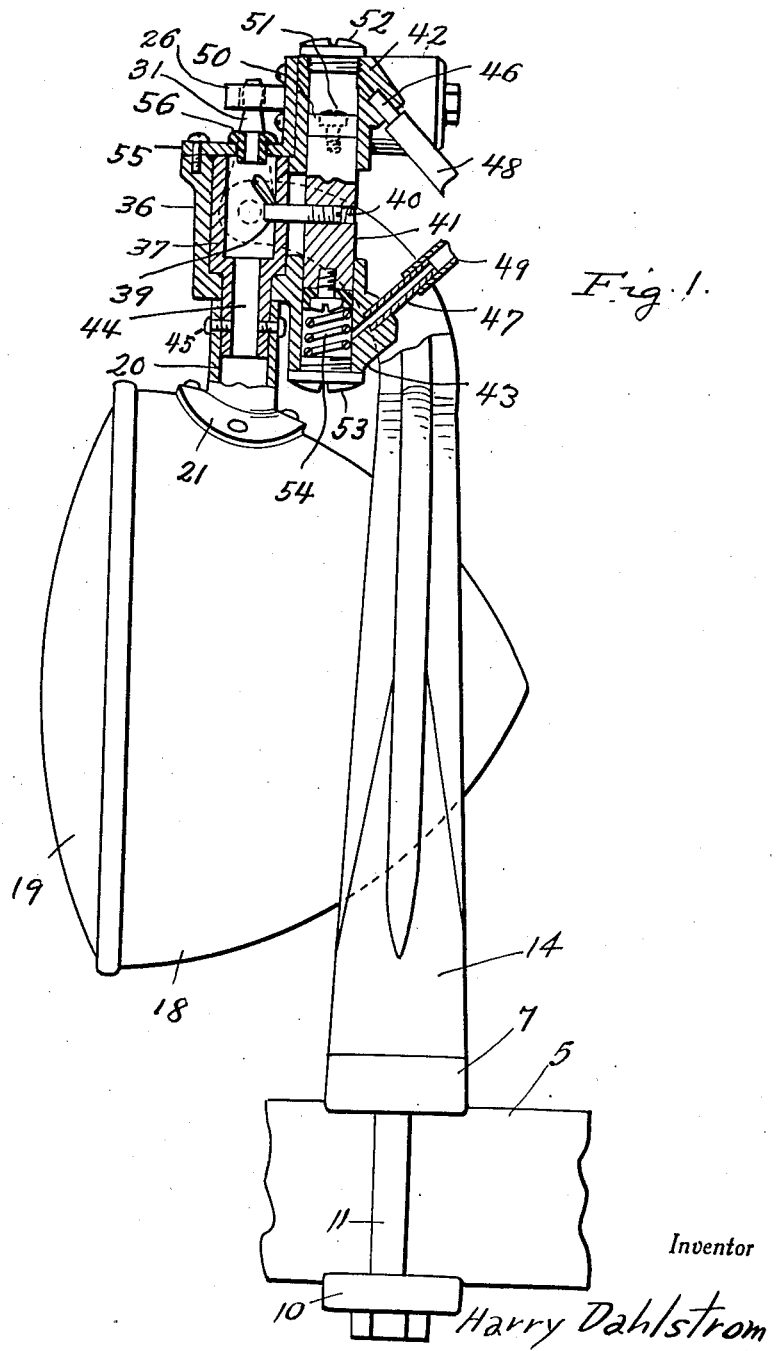

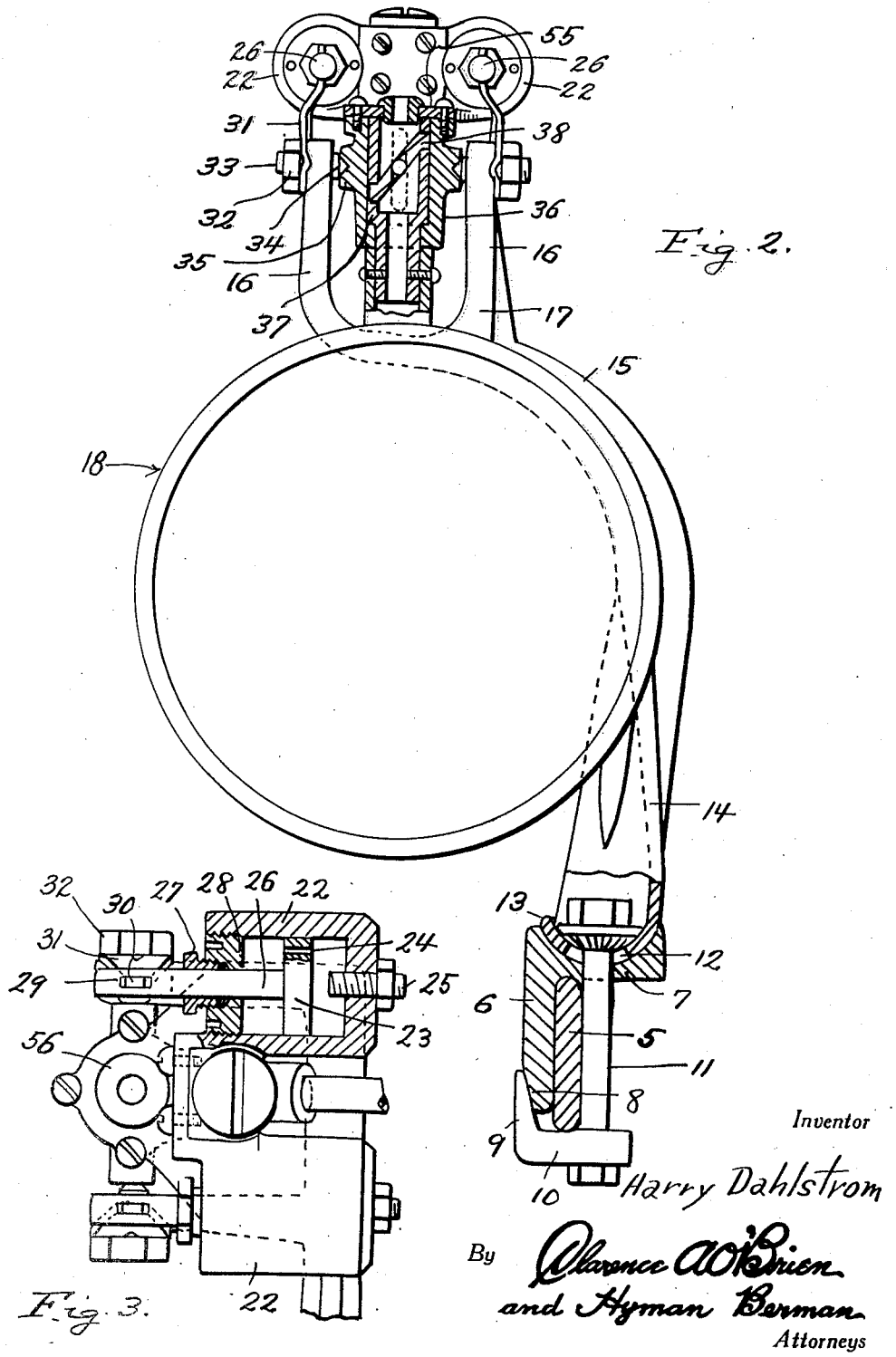

2,226,053

UNITED STATES PATENT OFFICE 2,226,053

DIRIGIBLE LAMP

Harry Dahlstrom, Chicago, Ill.

Application January 12, 1939, Serial No. 250,629

2 Claims. (Cl. 240—62.3)

This invention appertains to new and useful improvements in light projectors for vehicles, especially automobiles.

The principal object of the present invention is to provide a light projector which in use will be automatically controlled by the steering mechanism of the vehicle.

Another important object of the invention is to provide a dirigible light projector which will automatically swing on a horizontal plane in accordance with the direction of the vehicle and which will also be automatically controlled when the vehicle is ascending or descending hills.

Other objects and advantages of the invention will become apparent to the reader of the following specification.

In the drawings:

Figure 1 represents a side elevational view of the projector with parts in section.

Figure 2 is a front elevational view of the projector with parts in section.

Figure 3 is a top plan view of the cushioning and turning means associated with the projector.

Figure 4 is a fragmentary side elevational view of a steering column and base of the usual steering wheel with the parts included in the present invention shown in section.

Figure 5 is a cross sectional view taken substantially on the line 5—5 of Figure 4.

Referring to the drawings wherein like numerals designate like parts, it can be seen in Figures 1 and 2, that numeral 5 represents the usual bumper bar with which the clamp means of the projector is associated. This clamp means consists of the inverted L-shaped member 6, the upper portion of which is concaved as at 7. The lower portion of the inverted L-shaped member 6 is beveled as at 8 and against this can be wedged the beveled foot 9 of the lug 10. The bolt 11 extends through the lug 10 and through an opening in the upper portion of the L-shaped member 6 to pass through the slot 12 in the dished bottom portion 13 of the standard 14, which extends upwardly and curves laterally as at 15 and terminates in the upstanding legs 16—16 of the fork 17.

As shown in Figure 1, numeral 18 denotes the lamp case which has the usual lens 19. Rising from the top of the case 18 is the tube 20 and this tube is flanged as at 21 and suitably secured to the case 18.

The cushioning means for the lamp consists of the pair of cylinders 22—22 in each of which is a plunger 23 having a small vent or vents 24 therein to permit by-pass of fluid contained in the cylinder 22. A threaded member 25 is disposed into each of the cylinders to form an adjustable stop for the corresponding plunger.

Each plunger has a rod extension 26 operative through a corresponding packing gland 27 carried by the plug 28 in one end of the cylinder. The outer end of each of the plunger rods 26 is formed with a slot 29 for receiving the upper end 30 of an arm 31, each of these arms being clamped at its lower portion between the upper outside portion of the corresponding yoke leg 16 and the nut 32. These nuts 32 are located on the pins 33 which have pointed ends 34 operative in the recessed bearing bosses 35 which project laterally from the shell 36. In this shell is the barrel 37 formed with a spiral grooveway 38 and this grooveway 38 receives the pin 39 which has one end threadedly disposed into the threaded transverse bore 40 of the vertical plunger 41 which operates at its upper end in the upper vertical cylinder 42 and at its lower end in the lower vertical cylinder 43.

The barrel 37 has the depending tube 44 which extends downwardly into the tube 20 which rises from the case 18, and set screws 45 driven through the wall of the tube 20 engage into the tubular depending member 44 so that the tube 20 and case 18 are rotatable with the barrel 37.

Extending into ports of the cylinders 42 and 43 are the nipples 46 and 47 over which engage the forward ends of the tubes 48 and 49. The upper and lower ends of the plunger 41 are provided with packing members 50 secured in place by screws 51. The upper end of the cylinder 42 is closed by the plug 52 while the lower end of the cylinder 43 is closed by the plug 53. A coiled compressible spring 54 is interposed between the plug 53 and the packing at the lower end of the plunger 41. The top plate 55 has a bushing of insulation 56 extending through an opening in the same and through this can be disposed conductors. These conductors can be disposed through the barrel 37, tubes 44 and 20 to the lamp socket inside of the case 18.

The means for supplying fluid to the cylinders 43 and 42 is shown in Figure 4. Numeral 57 denotes the usual steering shaft housing which is stationary while numeral 58 denotes the usual base of the steering wheel (not shown).

On the upper end of the housing 57 is the split clamp band 59 which carries the box structure 60 in which the shell 61 is swingably mounted on the trunnions 62 and inside of this case 61 is the ball bearing assembly 63 through which the shaft 64 is disposed, the upper or steering wheel end of this shaft carrying the rubber roller 65 for riding contact with the base portion 58 of the steering wheel.

The trunnions 62 are connected to lugs 66 on the band 59 by springs 67 which serve to pull the ball bearing assembly case 61 toward the housing 57 so that the roller 65 will tensionally engage the steering wheel base 58.

A plate 68 is provided with clamp bands 69 and 70 for embracing the steering shaft housing 57. On this plate is the bearing block 71 through which the shaft 72 is journaled and one end of this shaft is threaded as at 73 and engage into the threaded bore of the block 74 which has its lower portion riding in the guide slot 75 of the plate 68. The block 74 has secured thereto by screws 76 and 77, the box-like structure 78 from which extends the plunger rod 79 operating through the packing gland 80 in the plug 81 of the cylinder 82. This rod 79 is attached to the plunger 83 in the cylinder 82. The opposite end of the cylinder 82 has the plug 84 therein and from this extends the tube 49 to connect to the cylinder 43 (see Figure 1). The tube 48 extends from the opposite end portion of the cylinder 82.

Obviously in the operation of the mechanism, it can be seen that when the steering wheel base 58 is rotating in one direction, the box 78 will be slid in one direction to operate the plunger 83 of the cylinder 82 either downwardly or upwardly, thereby either compressing or forcing fluid along the tube 48 or 49 with the result that the fluid is delivered to the upper cylinder 42 or the lower cylinder 43 so that the pin 39 is moved in the spiral slot 38 with the result that the barrel 37 (see Figures 1 and 2) is rotated in either one direction or the other, and carrying with it the lamp case 18.

The cylinders 22—22 serve as shock absorbers. For instance, when the vehicle is going up-grade, the lamp 18 will find its center of gravity and will illuminate the roadway immediately in front of the vehicle. However, as the vehicle travels over the top of the hill the action of the cylinders 22 and the plungers 23 will retard the return of the lamp case 18 to a position perpendicular to the ground until the vehicle is safely over the top of the hill. Thus the road in front of the vehicle is illuminated at all times regardless of the turning travel or inclined travel of the vehicle.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In combination with a steering wheel, a swingable light projector and means between the steering wheel and the light projector whereby the light projector is swung to illuminate a roadway at the side to which the steering wheel is turned, said means comprising a fluid cylinder having a plunger therein, a roller in rolling contact with the steering wheel, rectilinear motion converting means between the roller and the plunger, a conduit from each end of the cylinder, and cylinder and plunger means at the light projector to which the said conduits connect, said cylinder and plunger means at the light projector consisting of a pair of vertically aligned and spaced cylinders, a plunger having its upper end operative in the upper cylinder and its lower end operative in the lower cylinder, a pin extending laterally from the intermediate portion of the last-mentioned plunger, said light projector having a spirally slotted barrel extending therefrom, said pin being operative in the slot of the barrel.

2. In combination with a steering wheel, a swingable light projector, means between the steering wheel and the light projector whereby the light projector is swung to illuminate a road at the side to which the steering wheel is turned, said means comprising a fluid cylinder having a plunger therein, a roller in rolling contact with the steering wheel, rectilinear motion converting means between the roller and the plunger, a conduit from each end of the cylinder, cylinder and plunger means at the light projector to which the said conduits connect, said cylinder and plunger means at the light projector consisting of a pair of vertically aligned and spaced cylinders, a plunger having its upper end operative in the upper cylinder and its lower end operative in the lower cylinder, said light projector having a barrel extending therefrom, and a rotary motion transmitting means between the last-mentioned plunger and the barrel.

HARRY DAHLSTROM.